Aug. 29, 1944. J. W. TETER 2,356,954
CATALYTIC CRACKING
Filed June 8, 1940
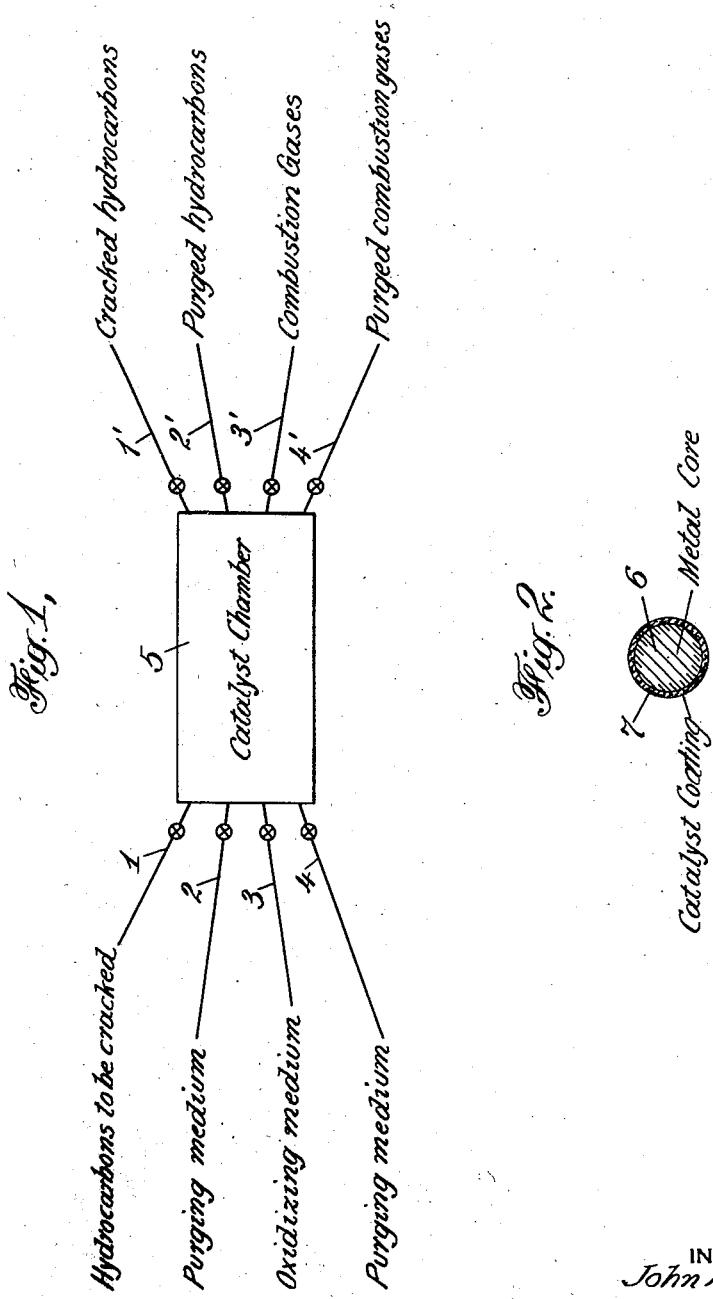
INVENTOR
John W. Teter
BY
ATTORNEYS Patented Aug. 29, 1944

2,356,954

UNITED STATES PATENT OFFICE 2,356,954

CATALYTIC CRACKING

John W. Teter, Chicago, Ill., assignor to Sinclair Refining Company, New York, N. Y., a corporation of Maine Application June 8, 1940, Serial No. 339,459

1 Claim. (Cl. 196—52)

This invention relates to improvements in the cracking of higher boiling petroleum stocks such as gas oil with a catalyst at elevated temperatures to produce lower boiling stocks and particularly gasoline stocks of improved anti-knock value. Among the cracking catalysts used in this general type of operation are the oxides and the silicates of aluminum, chromium and zirconium. In one form of such operations, the hydrocarbons to be cracked and an oxidizing medium to regenerate the catalyst are alternately passed through a body of a catalyst of this class under conditions controlled with respect to time, temperature and pressure to produce the desired cracking in the cracking step and to eliminate deposited carbonaceous material and to restore the activity of the catalyst in the regeneration step. The cracking step and the regeneration step are conventionally separated by purges to prevent contamination of the cracked products and to avoid fire and explosion hazards. The cracking reactions are usually endothermic, whereas the regeneration reactions are usually exothermic, but with the ordinary catalyst material several factors combine to make an effective operating balance of these heat quantities difficult to attain. For example, maximum temperatures must be limited during regeneration to prevent destruction of catalyst activity and, likewise, the cracking step must usually be carried out within a rather narrow temperature range to secure uniform results, yet the volumetric thermal capacity of the ordinary catalyst tends to be insufficient to carry the heat required in the cracking step to that step from the regeneration step or to carry sufficient heat absorbing capacity from the cracking step to the regeneration step within such temperature limits. A number of expedients have been proposed and some have been used to maintain this balance notwithstanding such limitations. For example, temperature rise in the catalyst material during the regeneration step has been limited by dilution of the oxidizing medium and the heat balance has been further established by the elimination or absorption of heat in one or both of the purging steps separating the cracking step from the regeneration step. This invention provides an improvement in the operating cycle, which materially assists in establishing and maintaining this heat balance and which thus benefits the operation in several important respects.

The catalyst material useful in this invention consists essentially of pellets having a metal core covered with a thin film of the catalyst proper. Metals with a melting point higher than the maximum temperature encountered during the operating cycle are generally useful, although it is best to avoid metals which tend to exert any special counter-catalyst effect. Iron and nickel, for example, can be used. The catalyst film is formed of one or more of the oxides and silicates of aluminum, chromium and zirconium. The catalyst film may be deposited chemically upon the surface of the metal cores. If the catalyst is one of the class which is activated by calcination, the final calcination may be effected with respect to the coated cores. The catalyst film may also be compressed upon the metal cores. When the catalyst material is formed in this manner, the surface of the metal cores may be subjected to mild oxidation prior to covering with the catalyst to promote adhesion between the core and the catalyst film. This expedient may also be used when the catalyst film is deposited chemically. The metal core of the catalyst material useful in this invention contributes to its effective volumetric thermal capacity in two ways. First, it adds mass to the total catalyst material which does not participate in the cracking reactions or in the regeneration reactions and which thus extends the thermal capacity of the total catalyst material with respect to such reactions. Although in one respect this might be regarded as dilution of the catalyst, the relatively high specific gravity of the metal enables the end to be accomplished efficiently notwithstanding the dilution. Second, although the specific heat of the catalyst proper may exceed the specific heat of the core metal by as much as 50% or more, at the cracking temperature, the relatively high specific gravity of the core metal produces an ultimate gain in volumetric thermal capacity, which is proportional to the product of the specific gravity and the specific heat. The apparent density of the catalyst proper, moreover, is much less than would be represented by a value corresponding to the real specific gravity since these catalysts are normally prepared to expose an abnormally large surface per unit of weight.

In terms of process, the operation of the invention comprises alternately contacting the catalyst material just described with the hydrocarbons at a cracking temperature and with an oxidizing medium. Heat liberated during a preceding regeneration step and thus stored in the catalyst material, and particularly in the metal cores, is available in the cracking step to supply the heat required in cracking. Heat absorbed in the cracking step puts the catalyst material in a condition to absorb heat in a subsequent regeneration step and thus to limit the temperatures attained during the regeneration step. In effect the invention might be described as increasing the thermal inertia of the catalyst material and thus making it possible to carry the heat required to establish a balance back and forth between the cracking step and the regeneration step within a narrower range of temperatures.

Figure 2 of the accompanying drawing illustrates, in section, the structure of a pellet of catalyst material useful in the invention, and Figure 1 illustrates, diagrammatically and conventionally, one form of process embodying the invention.

As illustrated in Figure 2, the catalyst material useful in the invention comprises pellets having metal cores 6 covered with a thin film 7 of a catalyst of the specified class. In practice, the size of the pellets will vary depending upon the particular conditions under which they are to be used. In general, the pellets should be as small as can be conveniently handled in the particular apparatus and operation. The pellets may for example be about $\frac{1}{16}$ inch in diameter and generally spherical in configuration. The precise shape of the pellets is not important although it should be such as to permit free passage of fluids through a packed mass of the catalyst material. With pellets about $\frac{1}{16}$ inch in diameter, the catalyst film may approximate $\frac{1}{100}$ of an inch in thickness.

Figure 1 diagrams a process embodying the invention. A catalyst chamber 5, or a series of such chambers, is charged with the catalyst material just described. This catalyst chamber 5, for example, may be one of a group of chambers in the form of segments of an annulus revolved between two ported plates to establish the successive steps of the operating cycle as described in an application of Oliver F. Campbell, filed August 16, 1939, Serial No. 290,398, now U. S. Patent 2,304,397.

As illustrated in Figure 1, in the cracking step, the hydrocarbons to be cracked are supplied to the catalyst chamber through connection 1 and the cracked hydrocarbons are discharged from the catalyst chamber through connection 1', the valves in connections 1 and 1' being open and the valves in the remaining connections being closed, and in the regeneration step an oxidizing medium, usually a mixture of air and steam or air and flue gases, is supplied to the catalyst chamber through connection 3 and the resulting combustion gases are discharged through connection 3', the valves in connections 3 and 3' being open and the valves in the remaining connections being closed. Another cracking step is then effected with the regenerated catalyst in the catalyst chamber, and so on. Between the cracking step and the regeneration step, hydrocarbons retained by the catalyst material which would be lost during regeneration are stripped from the catalyst material by a purging material supplied through connection 2, the purged hydrocarbons being discharged through connection 2'. Between the regeneration step and the cracking step, combustion gases retained by the catalyst material are stripped from the catalyst material by a purging medium supplied through connection 4, the purged combustion gases being discharged through connection 4'. The purging medium in both purging steps may be steam, for example. The purged hydrocarbons discharged through connection 2' may be collected with the cracked hydrocarbons discharged through connection 1' and, similarly, the purged combustion gases discharged through connection 4' may be discharged with the combustion gases discharged through connection 3'. After preheating to establish operation, the cracking operation may be continued in balance while maintaining the temperature in the catalyst chamber within a range, for example, of 875°–975° F. or within a range narrower than 100° F.

In one aspect the improvements of this invention make it possible to prolong the time over which the catalyst material continues to function effectively as a cracking catalyst and thus to diminish the frequency of shifts from step to step in the operating cycle. In another aspect, the improvements of the invention make it possible to increase the proportion of the time required by the complete operating cycle devoted to the cracking step.

I claim:

In a process for cracking hydrocarbons involving repeated alternate contacting of a catalyst material first with hydrocarbons to be cracked in a cracking step, wherein cracking occurs and heat is absorbed from and carbonaceous material is deposited on said catalyst material, and then with an oxidizing medium in a regenerating step, wherein heat is generated and absorbed by said catalyst material and regeneration of the catalyst for further use in said cracking step is effected, the improvement comprising contacting said catalyst material in the form of pellets having a metal core covered with a thin film of a catalyst of the class consisting of the oxides and silicates of aluminum, chromium and zirconium, alternately with the hydrocarbons to be cracked in said cracking step and with the oxidizing medium in said regenerating step.

JOHN W. TETER.